Nov. 3, 1925.　　　　　　　　　　　　　　　　　　　1,560,462
R. A. BOEHM
SELF OPENING AND CLOSING THREADING DIE HOLDER
Filed Sept. 1, 1923　　　2 Sheets-Sheet 1
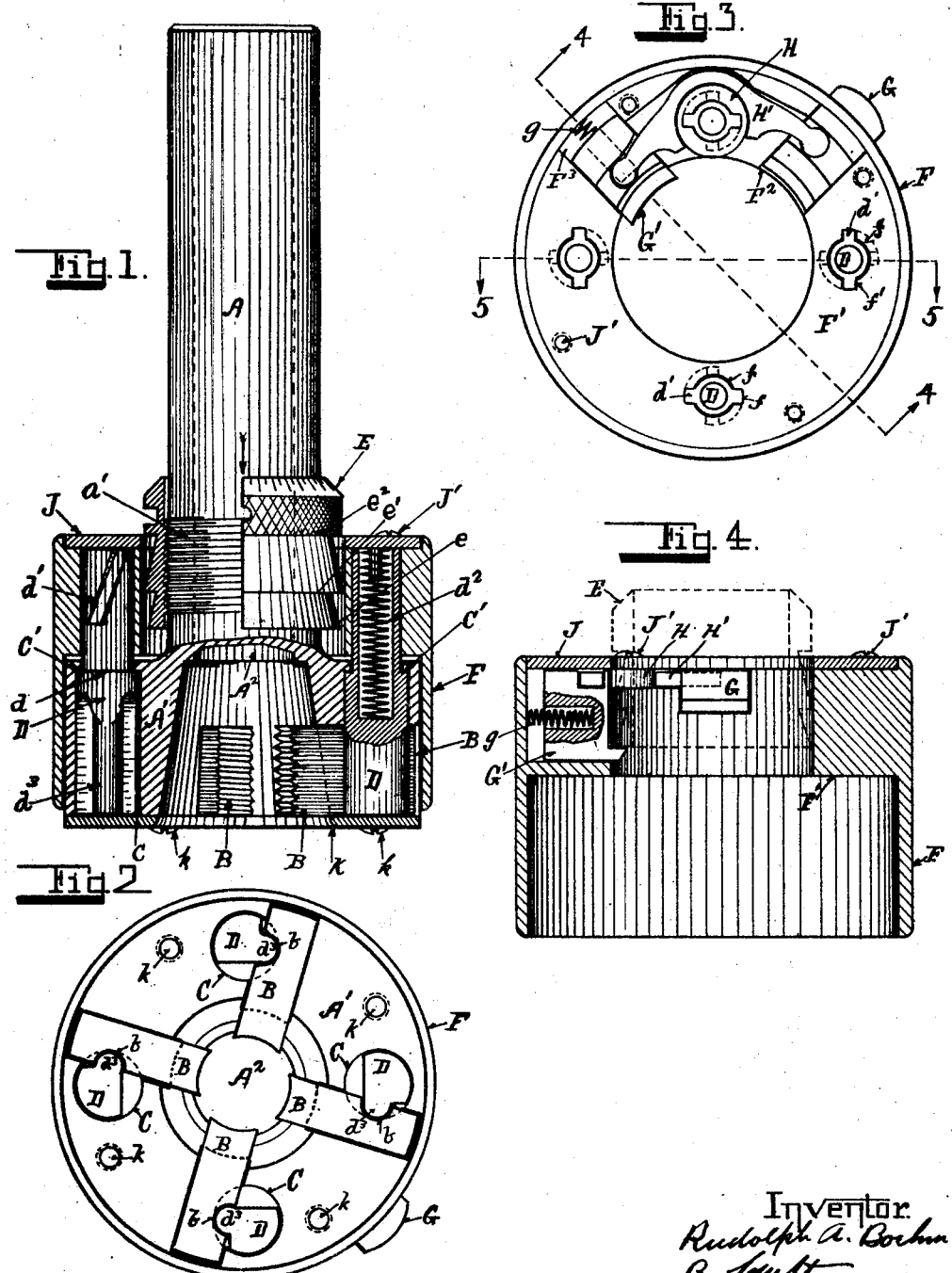

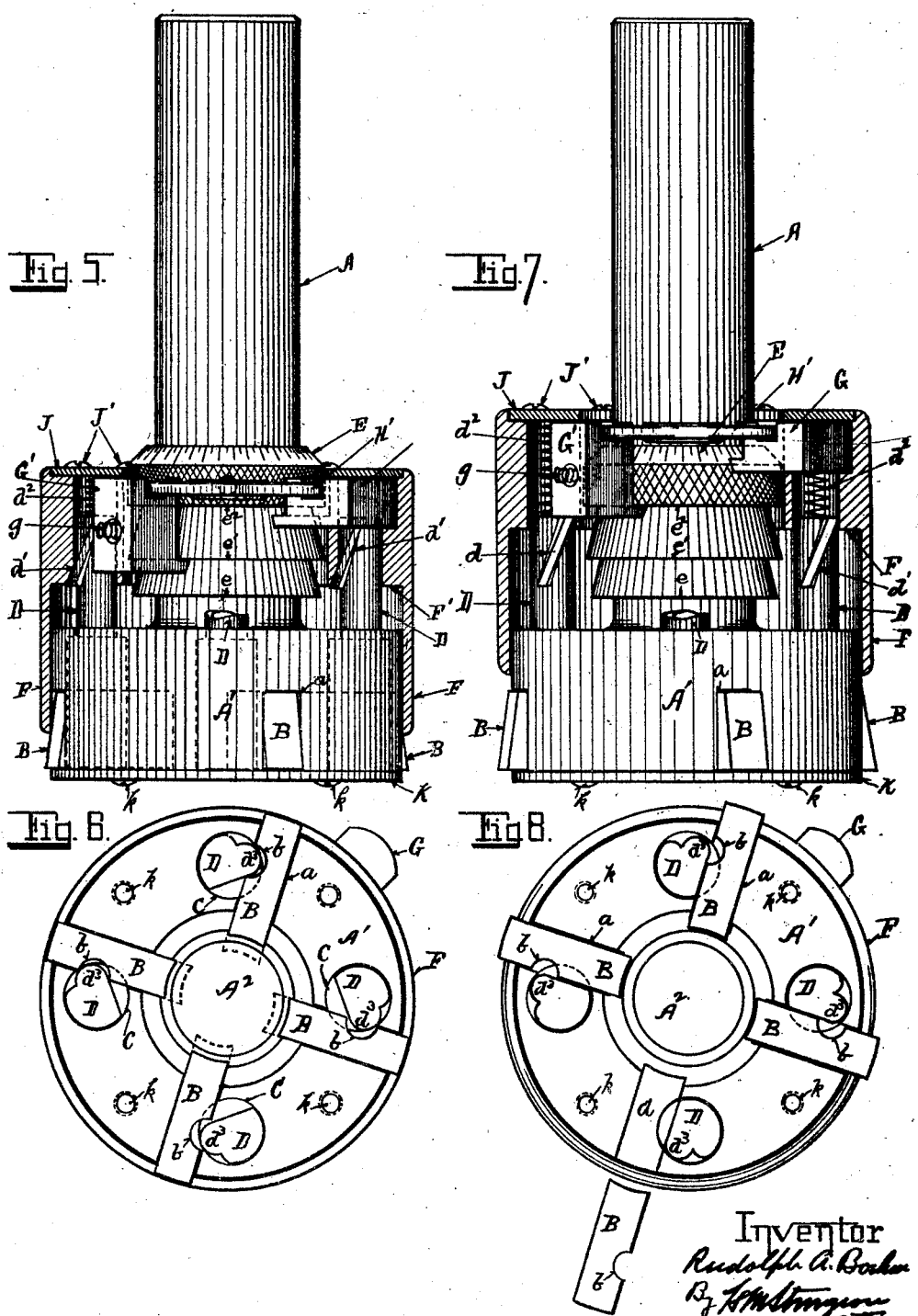

Patented Nov. 3, 1925.

1,560,462

UNITED STATES PATENT OFFICE.

RUDOLPH A. BOEHM, OF ERIE, PENNSYLVANIA, ASSIGNOR TO RICKERT-SHAFER COMPANY, OF ERIE, PENNSYLVANIA.

SELF OPENING AND CLOSING THREADING-DIE HOLDER.

Application filed September 1, 1923. Serial No. 660,555.

*To all whom it may concern:*

Be it known that I, RUDOLPH A. BOEHM, a citizen of the United States, residing at Erie, in the county of Erie and State of Pennsylvania, have invented certain new and useful Improvements in Self Opening and Closing Threading-Die Holders; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to self opening and closing threading die holders, and the object thereof is to provide mechanism which can be operated to move the chaser radially toward and away from the work piece, and also to release the chasers so that they can be removed without the necessity to removing any screws or bolts.

The features of this invention are hereinafter fully set forth and pointed out, and are illustrated in the accompanying drawings, in which:

Figure 1 is a side view, partially in longitudinal central section of a die-holder, embodying this invention, in position to make a cut.

Figure 2 is a bottom plan view of the lower end thereof having the end plate removed.

Figure 3 is a top plan view of the operating ring, having its covering plate removed.

Figure 4 is a transverse vertical section of the same on the line 4—4 in Fig. 3.

Figure 5 is a transverse vertical section on the line 5—5 in Fig. 3 and in elevation showing the latch mechanism, in the open position thereof.

Figure 6 is a bottom plan view of Fig. 5, having the bottom plate removed.

Figure 7 is a view similar to Fig. 5 of the die holder in position for removal and replacement of the chasers.

Figure 8 is a bottom plan view of Fig. 7, showing one of the chasers removed.

In these drawings A indicates the shank of the die holder, A' indicates the head thereof. Longitudinally through the shank A and head A' is an opening $A^2$. In the lower face of the head A' are cut radial slots, $a$, in which are placed the thread cutting chasers B. These chasers B are provided with transverse semi-circular slots $b$. The head A' is provided with cylindrical openings C, the peripheries of which cut through one of the side walls of each of said radial slots $a$, as shown in Figs. 2, 6 and 8. In the upper ends of the openings C are annular shoulders C', see Fig. 1.

In the openings C are placed rotatable shafts D which are provided with radial shoulders $d$, see Fig. 1, which engage the annular shoulder C' in the opening C, said shafts projecting above the upper surface of the head A', where they are provided with diagonal ribs $d'$, see Figs. 1, 5 and 7. The shafts D are provided with longitudinal openings in which springs $d^2$ are placed, see Figs. 1, 5 and 7. The springs $d^2$ are placed in the cavities of the hollow shafts D for convenience, and are for the purpose of forcing the ring F to move longitudinally on the body portion A' from the relative positions of said parts as shown in Figs. 1 and 5, to their positions as shown in Fig. 7. On the shank A are placed screw threads $a'$ see Fig. 1, upon which an adjusting sleeve E is placed, said sleeve being provided with radial shoulders $e$, $e'$ and $e^2$ around its periphery, the surface of said sleeve between said shoulders being conical, as shown in Figs. 1, 5 and 7.

The upper end of the sleeve E is provided with a graduated scale in the usual manner.

Upon the head A' is placed a slidable sleeve F see Fig. 4, which is provided with an annular shoulder F' adapted to pass over the sleeve E on the shank A. This shoulder F' is pierced by openings $f$ having diagonal grooves $f'$ cut therein to receive the diagonal ribs $d'$ on the shafts D, as shown in Fig. 3, so that relative longitudinal movement of the sleeve F on the head A' imparts a partial rotation to the shaft D in the head A'.

In the upper surface of the annular shoulder F' are cut radial slots $F^2$ and $F^3$, see Fig. 3, in which are placed slidable latches G and G'. The latch G projects beyond the periphery of the sleeve F as shown in Figs. 2, 3, 6 and 8, and the latch G' is provided with a spring $g$, adapted to maintain the latch in its normal position as shown in Figs. 3, 4, 5 and 7.

Pivoted upon a post H on the shoulder

F' is a lever H' which extends into slots in the latches G and G', said shoulder F' being cut away to receive said lever, so that its upper surface will be even with the upper surface of said shoulder F'. When the latch G is pressed inwardly the lever H moves the latch G' against the spring g, outwardly. Upon the upper end of the sleeve F a plate J is placed and is secured thereon by means of screws J', which compresses the springs $d^2$ in the shafts D. The portions of the shafts D within the head A' have portions of their peripheries cut away, as shown in Fig. 1 so as to form longitudinal ribs $d^3$ thereon, see Figs. 1 and 2, which ribs enter the transverse slots b on the chasers B, as shown in Figs. 2 and 6 so that as the sleeve F is moved downwardly on the head the shafts D rotate and cause the chasers to move inwardly, and the lower end of the sleeve F passes downwardly over the outer ends of the chasers, thus aiding in holding the chasers to their work. When the sleeve moves upward and uncovers the outer ends of the chasers, the shafts D are operated thereby to move the chaser outwardly.

The shafts D and chasers B are maintained in place in the radial slots, a, by means of a bottom plate K, which is secured on the head A' by means of screws k.

In Figures 5 and 7, the latches G and G' are shown as if suspended, the metal of the shoulder F' in the sleeve F being cut away on the section line 5—5 looking in the direction of the arrows in Fig. 3, to reveal the inner ends of said latches.

In operation the shank A of the die holder is secured in a revolving spindle of a suitable machine, not shown, by which it is caused to revolve. A suitable stationary arm is so positioned on such machine that it will be in the circular path of the latch G when the die holder has moved forward far enough to cut the number of threads desired.

The spindle of the machine, not shown, is drawn backward far enough to force the ring F into the position on the shank body A' shown in Fig. 1, which will operate to force the chasers inwardly into cutting position. The machine is then started and the die holder is caused to revolve. When it has travelled forward along the lines of its axis the predetermined distance, the latch G strikes the stationary arm on the machine frame which, through the rock-lever H' releases the latch G' from the shoulder e at the lower end of the sleeve E, the latch G being at the same time pressed inwardly to engage the next shoulder e' on the sleeve E, thus permitting the springs $d^2$ to cause the ring F to move to the position shown in Fig. 5, which causes the chasers to be moved radially from the work piece, so that they will be free from the cut threads. The machine spindle is then drawn backwardly until the ring F, by engagement with said machine frame, is caused to be moved back to the position on the shank body A' shown in Fig. 1.

If it is desired to remove the chasers B, the die holder is removed from the machine spindle. The latch G is manually pressed inwardly, which permits the parts F and A' to assume the position shown in Fig. 5, with the latch G' engaging the shoulder e' on the sleeve E. The latch G is again manually pressed thus causing said latch G to move inwardly under said shoulder e'. A third third manual pressure causes the latches G and G' to successively engage the third and last shoulder $e^2$ on the sleeve E, which permits the ring F to move to its limit as shown in Fig. 7, so that the shaft D will be rotated sufficiently to permit of the chasers being removed from the die holder, as shown in Fig. 8, and replaced as desired.

The outer ends of the chasers are preferably inclined with relation to the movement of the sleeve F, so that they will contact with the sleeve in any working position, and be thereby held up to their work.

The longitudinal position of the sleeve F on the shank A, as fixed by the threads, a', regulates the depth of the threads being cut by the chasers.

Having thus fully described the invention so as to enable others to utilize the same, I do not desire to be limited to the exact mechanism shown and described, as many modifications can be made therein without departing from the scope of the invention, therefore what I claim as new and desire to secure by Letters Patent is:

1. In a device of the class described, a shank head having a radially slidable chaser mounted therein, a rotatable shaft mounted in said head, adapted to be rotated to engage said chaser to retain it in said head, a spring pressed ring longitudinally slidable on said head, coacting means in said ring and on said rotatable shaft adapted to rotate said shaft, spring pressed latch mechanism mounted in said ring, and stop mechanism adapted to be engaged by said latch mechanism to limit the longitudinal movement of said ring on said head.

2. In a device of the class described, a shank, a head on said shank having a radially movable chaser mounted therein, a spring pressed ring longitudinally slidably mounted on said head, a rotatable shaft mounted in said head and said ring, means on said shaft and said chaser adapted to be co-engaged by reason of a partial rotation of said shaft to retain the chaser in place, co-acting means in said ring and on said shaft adapted to rotate said shaft, a sleeve adjustably secured on said shank, and spring pressed latch mechanism mounted in said ring adapted to engage said sleeve and limit the longitudinal movement of said ring on said head.

3. In a device of the class described, a shank, a head thereon, radial chasers slidably mounted therein, rotatable shafts mounted in said head adjacent to said chasers, means thereon to engage said chasers, a spring pressed sleeve slidably mounted on said head, co-acting means on said shafts and in said sleeve adapted to rotate said shafts, a stop-shoulder on said shank, and latch mechanism mounted in said sleeve adapted to co-act with said stop-shoulders to control the rotation of said shafts.

4. In a device of the class described, a shank, a sleeve secured thereon, a plurality of stop-shoulders on said sleeve, a head on said shank, chasers radially mountd in said head, rotatable shafts mounted in said head adjacent to said chasers, means thereon to engage said chasers, a spring pressed sleeve slidably mounted on said head and adapted to engage the outer ends of said chasers, spiral ribs on said rotatable shafts, means in said spring pressed sleeve adapted to engage said spiral ribs to rotate said shafts, and spring pressed latch mechanism mounted in said slidable sleeve adapted to alternately engage said plurality of stop-shoulders to control the relative sliding of said sleeve on said head.

5. In a device of the class described, a shank, ratchet shaped stop-shoulders thereon, a head on said shank having radial slots therein, rotatable shafts mounted in said head, longitudinal ribs on said shafts projecting into said radial slots, spring pressed means slidably mounted on said head adapted to engage and rotate said shafts so that the ribs thereon will be turned backward out of said radial slots, latch mechanism mounted in said spring pressed means adapted to engage said stop-shoulders to control said spring pressed means, and chasers having a groove in each adapted to be inserted into said radial slots to be engaged by said longitudinal ribs when said shafts are rotated by said spring pressed sleeve.

6. In a device of the class described, a head, chasers radially mounted in said head, rotatable means to engage and disengage said chasers, slidable spring pressed means to control said rotatable means, and co-acting latch and stop mechanism to control said spring pressed means.

7. In a device of the class described, a shank, a head thereon, radial chasers mounted in said head, a spring pressed sleeve slidably mounted on said head, rotatable shafts mounted in said head, adjacent to said chasers and in said slidable sleeve, spiral grooves in said slidable sleeve, means on said shafts to engage and disengage said chasers, a sleeve adapted to be longitudinally adjusted on said shank, ratchet shaped annular stop-shoulders on said sleeve, a spring pressed latch mounted in said spring pressed sleeve and adapted to engage said ratchet shaped stop-shoulders, another latch mounted in said spring pressed sleeve and projecting beyond the periphery thereof and adapted to engage said ratchet shaped stop-shoulders, and a lever pivoted on said spring pressed sleeve, having the opposite ends thereof engaging said latches, whereby said latches are caused to alternately engage said stop-shoulders, to control the movement of said spring pressed sleeve.

In testimony whereof I affix my signature.

RUDOLPH A. BOEHM.